(12) United States Patent
Koning et al.

(10) Patent No.: US 9,175,149 B2
(45) Date of Patent: Nov. 3, 2015

(54) AQUEOUS DISPERSION AND A METHOD FOR APPLYING A COATING BASED ON SUCH A DISPERSION TO A SUBSTRATE

(75) Inventors: Cornelis Eme Koning, Brunssum (NL); Rudolfus Antonius Theodorus Maria Van Benthem, Limbricht (NL); Willem Jan Soer, Eindhoven (NL); Weihua Ming, Eindhoven (NL)

(73) Assignee: Nederlandse Organisatie Voor Toegepast Natuurwetenschappelijk Onderzoek Tno, Delft (NL)

( * ) Notice: Subject to any disclaimer, the term of this patent is extended or adjusted under 35 U.S.C. 154(b) by 1599 days.

(21) Appl. No.: 12/280,392

(22) PCT Filed: Feb. 15, 2007

(86) PCT No.: PCT/NL2007/000045
§ 371 (c)(1),
(2), (4) Date: Aug. 22, 2008

(87) PCT Pub. No.: WO2007/097614
PCT Pub. Date: Aug. 30, 2007

(65) Prior Publication Data
US 2009/0162669 A1     Jun. 25, 2009

(30) Foreign Application Priority Data

Feb. 22, 2006 (NL) ...................... 1031208

(51) Int. Cl.
*C08K 5/25* (2006.01)
(52) U.S. Cl.
CPC ............. *C08K 5/25* (2013.01); *Y10T 428/3162* (2015.04); *Y10T 428/3179* (2015.04); *Y10T 428/31681* (2015.04)

(58) Field of Classification Search
CPC ......................................................... C08K 5/25
USPC ......................................... 524/189, 191, 192
See application file for complete search history.

(56) References Cited

U.S. PATENT DOCUMENTS

| 3,345,336 A | 10/1967 | Kuhlkamp et al. ......... 525/328.6 |
| 4,894,261 A | 1/1990 | Gulbins et al. ................ 427/379 |
| 6,262,169 B1 | 7/2001 | Helmer et al. ................ 524/555 |
| 6,512,042 B1 * | 1/2003 | Fischer et al. ................ 524/558 |
| 2003/0125452 A1 * | 7/2003 | Nakano et al. ................ 524/503 |
| 2005/0256257 A1 * | 11/2005 | Betremieux et al. .......... 524/556 |
| 2006/0047062 A1 * | 3/2006 | Hsu et al. ...................... 524/556 |

FOREIGN PATENT DOCUMENTS

| EP | 0 300 378 | 1/1989 |
| WO | WO 99/58608 | 11/1999 |

OTHER PUBLICATIONS

Nakayama, Yasuharu. "Development of Novel Aqueous Coatings Which Meet the Requirements of Ecology-Conscious Society: Novel Cross-Linking System Based on the Carbonyl-Hydrazide Reaction and Its Applications." Progress in Organic Coatings. 51 (2004), pp. 280-299.

* cited by examiner

*Primary Examiner* — Peter D Mulcahy
(74) *Attorney, Agent, or Firm* — Roberts & Roberts, LLP

(57) ABSTRACT

The present invention relates to an aqueous dispersion based on a polymer and a crosslinker, a method for applying a coating to a substrate, and a substrate provided with such a coating. One aspect of the present invention is to provide a formulation for an aqueous dispersion that can be used to obtain a coating that will not turn yellow and is resistant to hydrolysis.

26 Claims, No Drawings

AQUEOUS DISPERSION AND A METHOD FOR APPLYING A COATING BASED ON SUCH A DISPERSION TO A SUBSTRATE

The present invention relates to an aqueous dispersion based on a polymer and a crosslinker, a method for applying a coating to a substrate, and a substrate provided with such a coating.

In practice, metal substrates are often provided with a coating, for example to make the metal resistant to corrosion. Another way of making metal resistant to corrosion is by adding certain elements to the metal, for example tin, bismuth or chromium. Such an application however requires for example galvanic aftertreatment, as frequently applied in the zinc industry.

Coating systems based on so-called ketone-functional polymers that can be crosslinked in the presence of a crosslinker are commercially available. The article entitled "Development of novel aqueous coatings which meet the requirements of ecology-conscious society: novel cross-linking system based on the carbonyl-hydrazide reaction and its applications" by Yasuhara Nakayama, Progress in Organic Coatings 51 (2004), 280-299, presents scientific results of a study focusing on the reaction between a carbonyl group and a hydrazide group, in particular the crosslinking reactions involved, physical characteristics of the crosslinking system and the reverse (decomposition) reaction. The carbonyl-hydrazide crosslinking reaction can be regarded as a fast reaction resulting in the formation of a urethane-acrylic hybrid film. Water-soluble hydrazide compounds for use as crosslinkers in waterborne coatings have moreover already been disclosed in U.S. Pat. No. 3,345,336. The product formed in such a crosslinking reaction is a so-called imine group, which may hydrolyse in a simple manner under the influence of moisture, which is disadvantageous for a durable coating. The bond formed in the reaction is unstable, and in the event of an increase in pH the equilibrium will shift in the direction of the reactants, resulting in loss of the properties of the crosslinked product. The water-repellent behaviour of the coating obtained is moreover unsatisfactory. A crosslinker used for such functional polymers is a water-soluble hydrazide compound, which is used for waterborne coatings.

Known from U.S. Pat. No. 6,262,169 is a latex polymer composition comprising a vinyl polymer comprising repeating units of amine-reactive carbonyl groups, a crosslinking component comprising nitrogen-containing compounds having at least two carbonyl-group-reactive amine nitrogens capable of undergoing protonation, and a volatile acid component that contains an organic acid having a boiling point of less than 250° C.

Known from U.S. Pat. No. 4,894,261 is a method for obtaining a coating consisting of several layers on a substrate, according to which an aqueous dispersion of a carbonyl-containing copolymer of mono-olefinic unsaturated compounds and polyhydrazides is used as a basecoat and the basecoat is formed by removing water from the aqueous dispersion, during which the carbonyl groups of the copolymer react with the polyhydrazides.

In the coating industry it is known to crosslink an anhydride-functional polymer with a polyamine crosslinker, but the coating ultimately obtained is highly susceptible to discolouration as a result of the formation of a reaction product containing an imide group. The reaction system comprises a ring opening with the anhydride-functional polymer and the formation of amidic acid as an intermediate product, which reversible reaction occurs at room temperature already. The crosslinking reaction becomes irreversible only when an imidisation reaction is effected at a temperature higher than 160° C. Such a reaction system is considered disadvantageous in practice, in particular on account of its toxicity and foul smell combined with volatility. The reaction system is moreover unstable, precluding durable use.

One aspect of the present invention is to provide a formulation for an aqueous dispersion that can be used to obtain a coating that will not turn yellow and is resistant to hydrolysis.

Another aspect of the present invention is to provide a method for applying a coating involving practically non-volatile or foul-smelling reactants, in which a water-soluble system can moreover be used.

Yet another aspect of the present invention is to provide a method for applying a coating, the coating obtained being unsusceptible to hydrolysis, showing good adhesion to the substrate and being curable at relatively low temperatures.

Yet another aspect of the present invention is to provide a stable formulation for a coating with which no premature crosslinking reaction will take place between the components at room temperature as long as the system is phase-separated and the crosslinker is in the water phase.

The aqueous dispersion referred to in the preamble is characterised in that the polymer is a cyclic anhydride-functional polymer and the crosslinker is a multifunctional hydrazine derivative.

One or more of the aforementioned objects is achieved by using such an aqueous dispersion. The aqueous dispersion is chemically and physically stable and, after evaporation of the water, it forms a film that will adhere to a substrate for a long time, which film shows practically no yellowing, improved resistance to hydrolysis, good flexibility, chemical resistance and hardness relative to the crosslinking system based on polyamines discussed above.

The multifunctional hydrazine derivative is represented as follows:

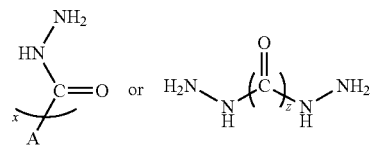

where:

$x \geq 2$, $z = 1$ or $2$,

A = a multifunctional aliphatic or aromatic $C_1$-$C_{20}$ radical.

The following can be mentioned as examples of substituent A: $CH_2$, $CH_2$—$CH_2$, $CH$=$CH$, $C_3H_6$, $C_3H_4$, $C_6H_4$ and $(CH_2)_n$, where $n = 1$-$20$.

Suitable examples of the multifunctional hydrazine derivative are dicarboxylic dihydrazides containing between 2 and 10 carbon atoms, in particular between 4 and 6 carbon atoms, such as oxalic dihydrazide, malonic dihydrazide, succinic dihydrazide, glutaric dihydrazide, adipic dihydrazide (ADH), sebacinic dihydrazide (SBDH), phthalic dihydrazide, isophthalic dihydrazide, terephthalic dihydrazide, maleic dihydrazide (MDH), fumaric dihydrazide, itaconic dihydrazide and the like. It is also possible to use multifunctional hydrazine derivates containing three or more hydrazide groups, such as citric trihydrazide, nitrilo-acetic trihydrazide, cyclohexanoic tricarboxylic trihydrazide, ethylene diamine tetraacetic tetrahydrazide and the like. In a particular embodiment it is possible to use as the multifunctional hydrazine derivatives aliphatic dihydrazines containing between 2 and 4 carbon atoms, such as ethylene-1,2-dihydrazine, propylene-1,2-dihydrazine, propylene-1,3-dihydrazine, butylene-1,2-dihydrazine, butylene-1,3-dihydrazine, butylene-1,4-dihydrazine and butylene-2,3-dihydrazine.

In a particular embodiment it is also possible to use as the multifunctional hydrazine derivative compounds obtained by causing at least a portion of the hydrazide groups contained in the water-soluble multifunctional hydrazine derivative to react with a carbonyl compound such as acetic aldehyde, propionic aldehyde, butyl aldehyde, acetone, methyl ethyl ketone, diethyl ketone, methyl propyl ketone, methyl butyl ketone, diacetone alcohol. Dihydrazide monoacetone hydrazone adipate and dihydrazide diacetone hydrazone adipate, to be regarded as the blocked multifunctional hydrazine derivative, can be mentioned as examples. By using such a blocked multifunctional hydrazine derivative the progress of the crosslinking reaction of the aqueous dispersion is controlled in a favourable way. Favourable results are obtained when the multifunctional hydrazine derivative is chosen from the group comprising adipinic dihydrazide, succinic dihydrazide and sebacinic dihydrazide.

The cyclic anhydride-functional polymer used in the present aqueous dispersion may be a copolymer or a graft polymer, the concentration of anhydride groups in the cyclic anhydride-functional copolymer amounting to 10-60 wt. %, preferably 20-50 wt. %, relative to the weight of the copolymer. Examples of copolymers are random, alternating and block copolymers, of which block copolymers, in particular provided with anhydride groups at the chain ends, are preferable.

Cyclic anhydride-functional graft polymers are obtained by causing polyolefines to react, at elevated temperature, with an anhydride compound, for example maleic anhydride, itaconic anhydride, citraconic anhydride and the substituted derivatives thereof, in the presence of a (hydro)peroxide.

The cyclic anhydride-functional polymer, which may in its alkyl chain also contain one or more anhydride-functional groups, is schematically represented below:

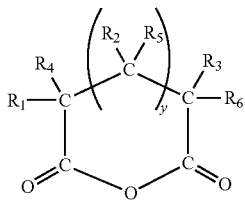

where:
$R_1$-$R_3$=H, whether or not substituted alkyl, polymer,
$R_4$-$R_6$=H, whether or not substituted alkyl,
y=0 or 1.

The cyclic anhydride-functional copolymer is schematically represented below:

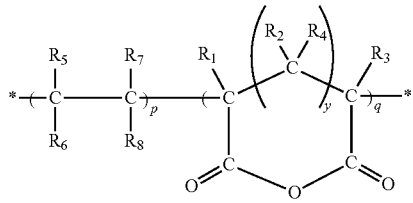

where:
$R_1$-$R_6$, y have the meanings specified above,
$R_7$,$R_8$=H, whether or not substituted alkyl, ether, aromatic substance,
p≥1, q≥1.

The copolymer represented above consists of several unsaturated monomers, at least one of which, referred to by "q" in the above copolymer structure, is chosen from the group comprising maleic anhydride, itaconic anhydride and citraconic anhydride. Examples of other possible unsaturated monomers, referred to by "p" in the above copolymer structure, are styrene, whether or not substituted, (meth)acrylates, alkyl vinyl ethers such as (m)ethyl vinyl ether, (iso/n)butyl ether.

The first reaction taking place between the cyclic anhydride-functional polymer and the multifunctional hydrazine derivative is ring opening and the formation of amidic acid as an intermediate product, the reaction products ultimately obtained, after muffling at a temperature of about 140° C., being imides, as represented in the reaction diagram below, which is merely intended to serve as an example. Similar reaction diagrams can be formulated for cyclic anhydride-functional copolymers, graft polymers and maleinised unsaturated oils/alkyd resins, too.

The diagram presented below comprises only one of the multifunctional hydrazine derivatives presented above, notably the derivative represented by the parameter x. It will be obvious that in the case of the present invention it is also possible that not all the hydrazines react with the reactive groups of the crosslinker, and that moreover embodiments are also conceivable in which not all the reactive groups of the crosslinker react with the hydrazines. The imide crosslinking taking place here is very resistant to hydrolysis. The fact that the reactants will not come into contact with one another in the aqueous dispersion at room temperature implies a stable one-component formulation, because no premature crosslinking will take place between the reactants.

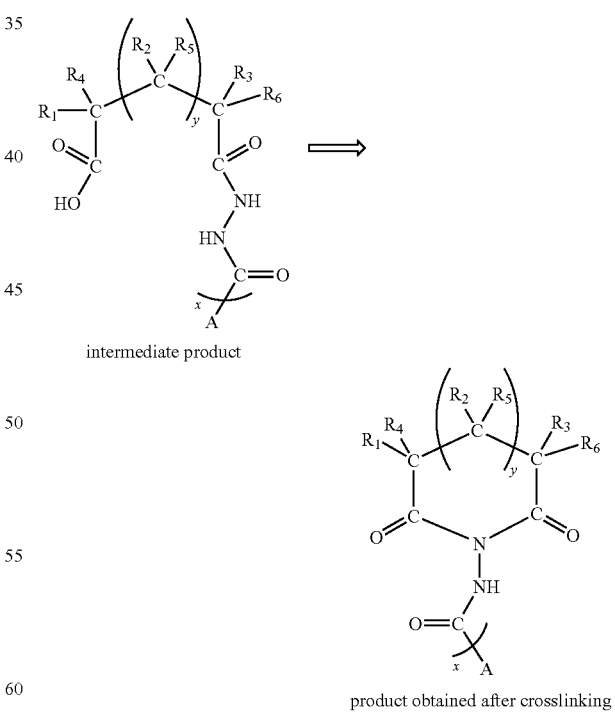

intermediate product product obtained after crosslinking where:
$R_1$-$R_6$, A, y and x have the meanings specified above.

A graft polymer must preferably contain at least one anhydride group per chain, the number of anhydride groups in the anhydride-functional graft polymer preferably amounting to 1-1000 mmol anhydride groups per kg of polymer, the average molar mass of this graft polymer being 1000-100,000 g/mol, in particular 10-800 mmol anhydride per kg of polymer, more specifically 100-500 mmol anhydride per kg of polymer.

From the viewpoint of a stable aqueous dispersion it is desirable for the amount of anhydride-functional polymer dispersed in the aqueous phase to be 5-70 wt. %, in particular 20-40 wt. %.

The size of the particles dispersed in the present aqueous dispersion will generally be between 5 and 2000 nm, preferably between 20 and 800 nm, in particular between 50 and 300 nm. The present anhydride-functional polymer is dispersed by causing a portion of the anhydride to react with a base, for example caustic soda, ammonia or an alkylamine compound. Such a reaction will cause ring opening of the anhydrides, resulting in the formation of an acid, which will cause the water-solubility to increase. If all the anhydride rings of for example an alternating styrene-maleic anhydride copolymer are opened, an entirely water-soluble polymer will be obtained. If however a portion of the anhydrides are subjected to such a ring-opening reaction, a water-dispersible polymer will be obtained, which will still contain a portion of (not-ring-opened) anhydride groups, which dispersed particles will contain a "skin" of hydrophilic acid groups. The rings of the anhydrides are preferably opened by adding an amine compound because the latter will form an imide on heating. If the ring opening is on the contrary effected with the aid of caustic soda, heating will result in the formation of an anhydride that is susceptible to hydrolysis, which is undesirable. Ammonia is used to increase the hydrophilicity, while heptylamine is used to protect a portion of the anhydrides against hydrolysis. If this does not take place, the partially hydrolysed polymers will be completely hydrolysed, resulting in a water-soluble polymer. If about 30% of the anhydride groups is converted into the imide form, for example by adding n-heptylamine, dispersions that are very stable in practice will be obtained. A particular advantage of such dispersions over an entirely soluble system is the fact that the viscosity will remain low at a solids content of about 20%. The viscosity of aqueous solutions will subsequently increase rapidly, which is considered user-unfriendly in practice.

The molar ratio of the functional anhydride groups in the anhydride-functional polymer and the functional groups in the crosslinker is preferably between 1:2 and 5:1, in particular between 1:1.2 and 3:1, more specifically between 1:1 and 1.5:1.

Another suitable group of cyclic anhydride-functional polymers comprises maleinised unsaturated oils and maleinised alkyd resins, the maleination resulting in the incorporation of cyclic anhydride groups. Such a reaction can be effected by heating unsaturated fats/oils or alkyd resins based on unsaturated fatty acids in the presence of an anhydride compound, for example maleic anhydride, itaconic anhydride, citraconic anhydride and the substituted derivatives thereof.

The present invention also relates to a method for applying a coating to a substrate using the present aqueous dispersion, which method is characterised in that, after being applied to the substrate, the aqueous dispersion is dried at a temperature of 10-50° C. to cause water to evaporate, after which curing is effected at a temperature of 70-220° C. It is particularly preferably for the drying temperature to be between 20 and 30° C., the curing being effected at a high temperature, preferably in an oven, between 130° C. and 180° C.

It is however also possible to carry out the method for applying a coating to a substrate so that the present aqueous dispersion is after application to the substrate exposed to a temperature of 70-220° C., in particular 100-180° C. The latter method is particularly preferable because the film formation and the crosslinking will be more homogeneous and a smooth film will be formed.

By using the aforementioned temperature ranges the present inventors surprisingly found that the amide-acid crosslink results in an imide structure via a ring closure, which imide structure is not mentioned in the US patents discussed above.

The present invention also relates to a substrate provided with a coating obtained by crosslinking the present aqueous dispersion. Substrates may be corrosion-susceptible substrates, such as iron and steel, but also alloys containing aluminium and/or magnesium, and also substrates based on textile, of either natural fibres such as cotton or synthetic fibres such as nylons, polyesters, polyolefines and combinations thereof, and also plastic, glass and wood, but allowance must be made for the temperature used for the crosslinking.

The present aqueous dispersion may be applied to the substrate using any commonly employed method, for example by means of immersion, spraying, with the aid of a brush and the like. To obtain good adhesion to the substrate it is preferable to clean the substrate beforehand and to degrease it with commonly employed organic solvents such as methanol, ethanol or acetone.

The present invention consequently provides a so-called one-component formulation with which no premature crosslinking will occur as long as the anhydride-functional polymer is dispersed or dissolved in a substantial amount of water. As soon as the water evaporates the two reactants will come into contact with one another, which will result in a reaction as discussed above. A further increase in temperature will lead to a durable coating that will show no yellowing and will be unsusceptible to hydrolysis.

To obtain a coating according to the present invention that has specific properties it is possible for the anhydride-functional polymer to contain one or more other functional groups, chosen from the group comprising perfluoroalkyl chains, silicone chains, chains containing aromatic groups and alkyl chains, for example straight, branched or cyclic chains.

To obtain a coating with excellent properties it is desirable for the Tg value of the anhydride-functional polymer to lie in the range of 0-220° C., preferably 20° C.-160° C. If a Tg value lower than 0° C. is used, a soft coating will be obtained, whereas high temperatures will be required to ensure good film formation in the case of polymers with a Tg value higher than 220° C., which may lead to degradation of the anhydride-functional polymer.

The present invention will be elucidated with reference to a number of examples below, to which it should be added that the present invention is by no means restricted to such specific examples.

Preparation of a Dispersion Based on styrene-alt-maleic Anhydride in the Presence of n-heptylamine 8.5 g of n-heptylamine dissolved in 100 ml of acetone is added drop by drop to a solution of 50 g of poly(styrene-alt-maleic anhydride), having a molecular weight of less than 10,000 g/mol, in 500 ml of acetone. This mixture is stirred for 1 hour at room temperature, after which acetone is removed through evaporation effected with the aid of a film evaporator. The polymer is then placed in a vacuum oven and left there for 24 hours at 150° C. This results in 55 grams of polymer, of which 30% of the anhydride groups has acquired an imide structure. In 2 hours' time 1.0 g of ammonia (25 wt. % in water) dissolved in 100 ml of acetone is added drop by drop to 30 grams of this polymer dissolved in 400 ml of acetone. This solution is then in 24 hours' time added drop by drop to 270 ml of water that is stirred under a continuous flow of nitrogen to cause the acetone to evaporate. The dispersion thus obtained is subsequently stirred for another 24 hours. The resulting dispersion has a solids content of 10%. As measured by means of light scattering, the particles have a size between 100 and 200 nm and constitute a very stable system. After more than eighteen months the properties of the dispersion show no appreciable changes and no precipitation takes place.

Preparation of a Dispersion Based on styrene-alt-maleic Anhydride without the Addition of n-heptylamine When no n-heptylamine is introduced into the polymer before preparing the dispersion, and only poly(styrene-alt-maleic anhydride) is consequently dispersed, the polymer will become entirely water-soluble within 24 hours.

Preparation of a Dispersion Based on poly(octadecene-alt-maleic Anhydride)

When 0.25 g of ammonia (25 wt. % in water) is added to 10 grams of poly(octadecene-alt-maleic anhydride) in 150 ml of acetone and this is in 10 hours' time added drop by drop to 100 ml of water, with stirring, a stable dispersion will be obtained. The particle size will be between 100 and 200 nm.

EXAMPLE 1

When 30 wt. % adipic dihydrazide is added to an aqueous dispersion of poly(styrene-alt-maleic anhydride) and this mixture is applied to an aluminium substrate with the aid of a doctor blade applicator, 10 minutes' curing in an oven at 150° C. will result in a transparent colourless film with good chemical resistance. No traces are observed after a hundred acetone double rubs.

EXAMPLE 2

When 30 wt. % adipic dihydrazide is added to an aqueous dispersion of poly(styrene-alt-maleic anhydride), of which 30% of the anhydride groups has reacted with n-heptylamine to form an imide, an emulsion with a particle size of between 100 and 200 nm and a pH of between 7 and 8 is obtained. This dispersion is still stable after more than 6 months and shows no particle aggregation. When a film is applied with the aid of a doctor blade applicator and is cured for 10 minutes in an oven at 130° C., a colourless film with good chemical resistance is obtained. No traces are observed after a hundred acetone double rubs.

EXAMPLE 3

When 30 wt. % adipic dihydrazide is added to an aqueous dispersion of poly(styrene-alt-maleic anhydride) and this mixture is heated to 100° C., imide formation of the anhydrides is observed.

EXAMPLE 4

When 20 wt. % adipic dihydrazide is added to a dispersion based on poly(octadecene-alt-maleic anhydride) and this mixture is applied to an aluminium substrate with the aid of a doctor blade applicator, a transparent colourless film with good chemical resistance is obtained after 30 minutes' curing in an oven at 100° C. No traces are observed after a hundred acetone double rubs.

COMPARATIVE EXAMPLE 1

When 30 wt. % 1,6-diaminohexane is added to an aqueous dispersion of poly(styrene-alt-maleic anhydride) and this mixture is applied to an aluminium substrate with the aid of a doctor blade applicator, a transparent but yellowed film is obtained after 10 minutes' curing in an oven at 150° C.

COMPARATIVE EXAMPLE 2

When 30 wt. % 1,6-diaminohexane is added to an aqueous dispersion of poly(styrene-alt-maleic anhydride), of which 30% of the anhydride groups has reacted with n-heptylamine to form an imide, an emulsion with a pH of more than 10 is obtained. This dispersion shows aggregation when the pH is lowered to a value of 5. The emulsion also shows pronounced yellowing. When a double amount of 1,6-diaminohexane is added the dispersed particles dissolve. This is not the case when use is made of adipic dihydrazide.

COMPARATIVE EXAMPLE 3

When a system as described in comparative example 2 is used to apply a film with the aid of a doctor blade applicator and the film is cured for 10 minutes in an oven at 130° C., a heterogeneous yellowed film that is not chemically resistant is obtained. The film is removed from the substrate in a hundred acetone double rubs.

COMPARATIVE EXAMPLE 4

When 30 wt. % 1,6-diaminohexane is added to a dispersion of poly(styrene-alt-maleic anhydride) and this is heated to 100° C., no imidisation of the anhydride groups is observed.

The invention claimed is:

1. An aqueous dispersion comprising a polymer and a crosslinker, wherein the polymer comprises a cyclic anhydride functional group, which polymer is in the form of a copolymer containing 20-50 wt. % cyclic anhydride groups based on the weight of the copolymer, and wherein the crosslinker is a multifunctional hydrazine derivative, wherein the amount of the polymer comprising a cyclic anhydride functional group dispersed in the aqueous phase is 5-70 wt. %, and wherein the size of the dispersed polymer particles is 5-2000 nm.

2. The aqueous dispersion according to claim 1, wherein the multifunctional hydrazine derivate is water-soluble.

3. The aqueous dispersion according to claim 1 wherein the multifunctional hydrazine derivative has at least 2 hydrazide groups.

4. The aqueous dispersion according to claim 3, wherein the multifunctional hydrazine derivative comprises dicarboxylic dihydrazides containing between 2 and 10 carbon atoms.

5. The aqueous dispersion according to claim 4, wherein the multifunctional hydrazine derivative comprises dicarboxylic dihydrazides containing between 4 and 6 carbon atoms.

6. The aqueous dispersion according to claim 4 wherein the dicarboxylic dihydrazides comprises one or more of adipic dihydrazide, succinic dihydrazide (SDH), isophthalic dihydrazide, maleic dihydrazide and sebacinic dihydrazide.

7. The aqueous dispersion according to claim 1 wherein the multifunctional hydrazine derivative has at least 3 hydrazide groups.

8. The aqueous dispersion according to claim 7, wherein the multifunctional hydrazine derivative comprises one or more of citric trihydrazide, nitrilo-acetic trihydrazide, 1,3,5-triazine trihydrazide (THT), cyclohexanic tricarboxylic trihydrazide and ethylene diamine tetra-acetic tetrahydrazide.

9. The aqueous dispersion according to claim 1 wherein the multifunctional hydrazine derivative is an aliphatic hydrazine containing between 2 and 4 carbon atoms.

10. The aqueous dispersion according to claim 9, wherein the aliphatic dihydrazine comprises one or more of ethylene-1,2-dihydrazine, propylene-1,2-dihydrazine, propylene-1,3-dihydrazine, butylene-1,2-dihydrazine, butylene-1,3-dihydrazine, butylene-1,4-dihydrazine and butylene-2,3-dihydrazine.

11. The aqueous dispersion according to claim 3, wherein a portion of the hydrazide groups has been caused to react with a carbonyl compound to effect the formation of a blocked multifunctional hydrazine derivative.

12. The aqueous dispersion according to claim 11, wherein the carbonyl compound comprises one or more of acetic aldehyde, propionic aldehyde, butylic aldehyde, acetone, methyl ethyl ketone, diethyl ketone, methyl propyl ketone, methyl butyl ketone and diacetone alcohol.

13. The aqueous dispersion according to claim 1 wherein the multifunctional hydrazine derivative comprises one or more of adipic dihydrazide, succinic dihydrazide and sebacinic dihydrazide.

14. The aqueous dispersion according to claim 1, wherein the polymer comprising a cyclic anhydride functional group is a graft polymer.

15. The aqueous dispersion according to claim 1, wherein the polymer comprising a cyclic anhydride functional group is a maleinised unsaturated oil or a maleinised alkyd resin.

16. The aqueous dispersion according to claim 1, wherein the copolymer is a block copolymer whose anhydride groups are at the ends of the chains.

17. The aqueous dispersion according to claim 1, wherein the anhydride functional group comprises one or more of maleic anhydride, itaconic anhydride and citraconic anhydride, or the substituted derivatives thereof.

18. The aqueous dispersion according to claim 14, wherein the cyclic anhydride-functional graft polymer contains 1-1000 mmol anhydride groups per kg of polymer, the average molar mass of this graft polymer being 1000-100,000 g/mol.

19. The aqueous dispersion according to claim 1 wherein the polymer comprising a cyclic anhydride functional group comprises one or more other functional groups comprising one or more of perfluoroalkyl chains, silicone chains, and chains containing aromatic groups and alkyl chains.

20. The aqueous dispersion according to claim 1 wherein the molar ratio of the functional groups in the polymer comprising a cyclic anhydride functional group, and the functional groups in the crosslinker is between 1:2 and 5:1.

21. A method for applying a coating to a substrate comprising applying to a substrate an aqueous dispersion comprising a polymer and a crosslinker, wherein the polymer comprises a cyclic anhydride functional group, which polymer is in the form of a copolymer containing 20-50 wt. % cyclic anhydride groups based on the weight of the copolymer, and wherein the crosslinker is a multifunctional hydrazine derivative, wherein the amount of the polymer comprising a cyclic anhydride functional group dispersed in the aqueous phase is 5-70 wt. %, and wherein the size of the dispersed polymer particles is 5-2000 nm, wherein after being applied to the substrate, the aqueous dispersion is dried at a temperature of 10-50° C. to cause water to evaporate, after which curing is effected at a temperature of 70-220° C.

22. The method for applying a coating to a substrate according to claim 21 wherein, after application to the substrate, the aqueous dispersion is exposed to a temperature of 70-220° C.

23. The method according to claim 22, wherein the exposing temperature is 100-180° C.

24. A substrate provided with a coating obtained by crosslinking the aqueous dispersion of claim 1.

25. The substrate according to claim 24, wherein the substrate comprises one or more of metals, wood, glass and plastic.

26. The aqueous dispersion of claim 1, wherein the copolymer comprising a cyclic anhydride functional group has the following formula:

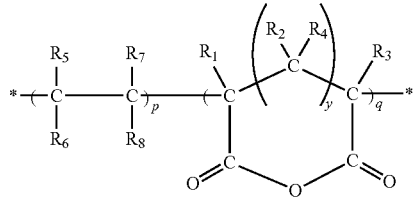

where:
$R_1$-$R_6$, y have the meanings specified above,
$R_7,R_8$=H, whether or not substituted alkyl, ether, aromatic substance,
$p \geq 1$, $q \geq 1$.

* * * * *